T. R. HANSON.
DIRIGIBLE HEADLIGHT MECHANISM.
APPLICATION FILED NOV. 25, 1916.
1,243,290.
Patented Oct. 16, 1917.
3 SHEETS—SHEET 1.
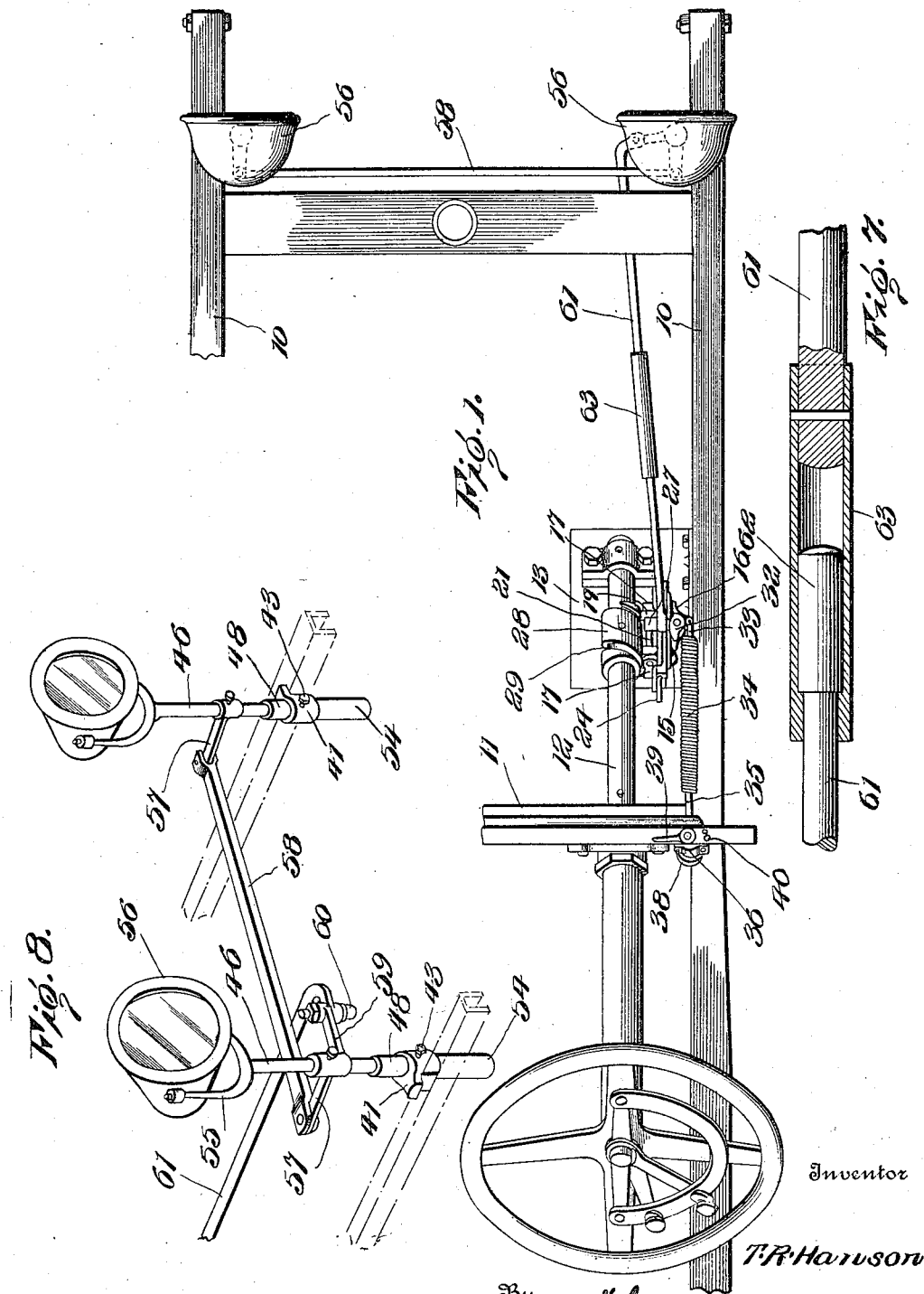
Inventor
T. R. Hanson
By
Attorneys

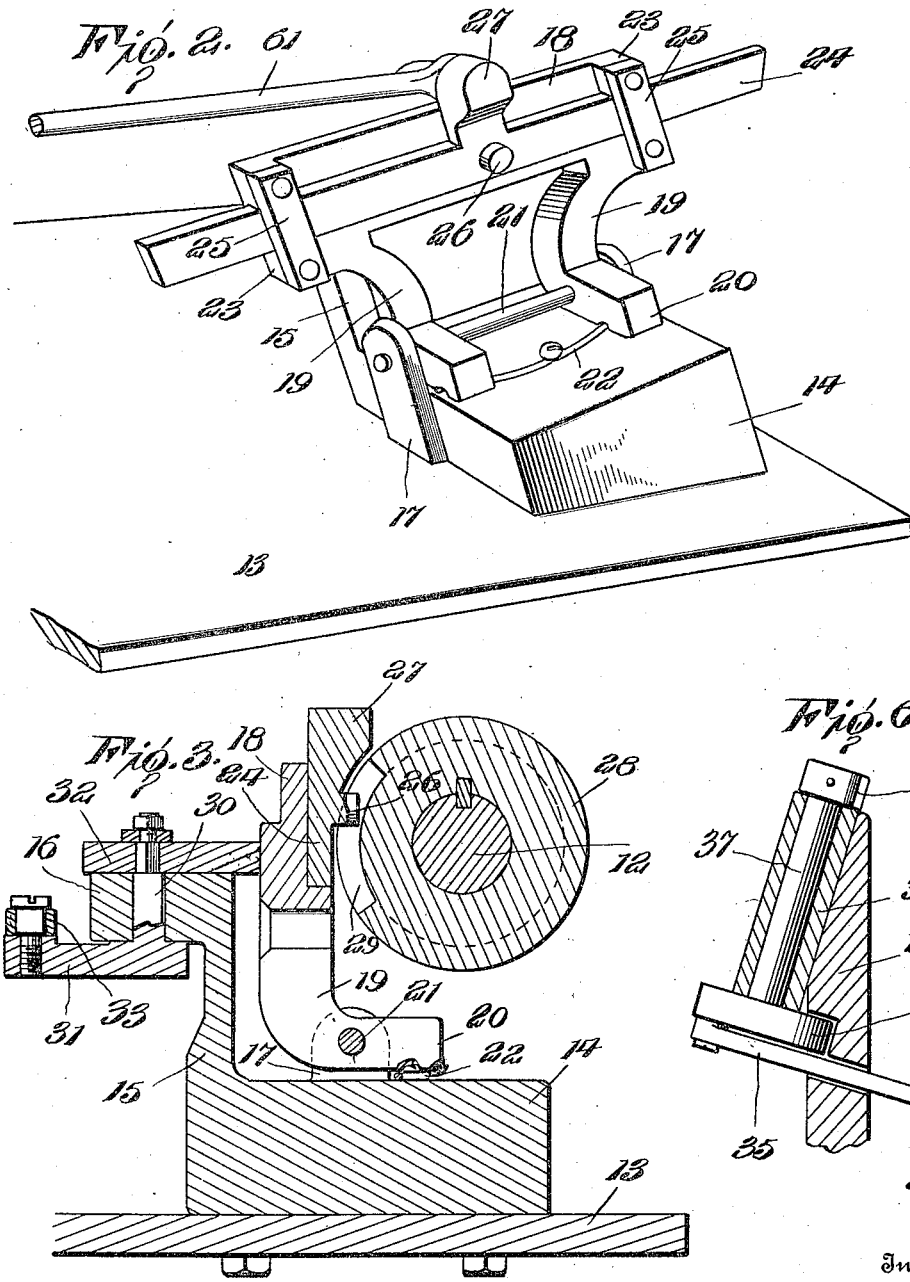

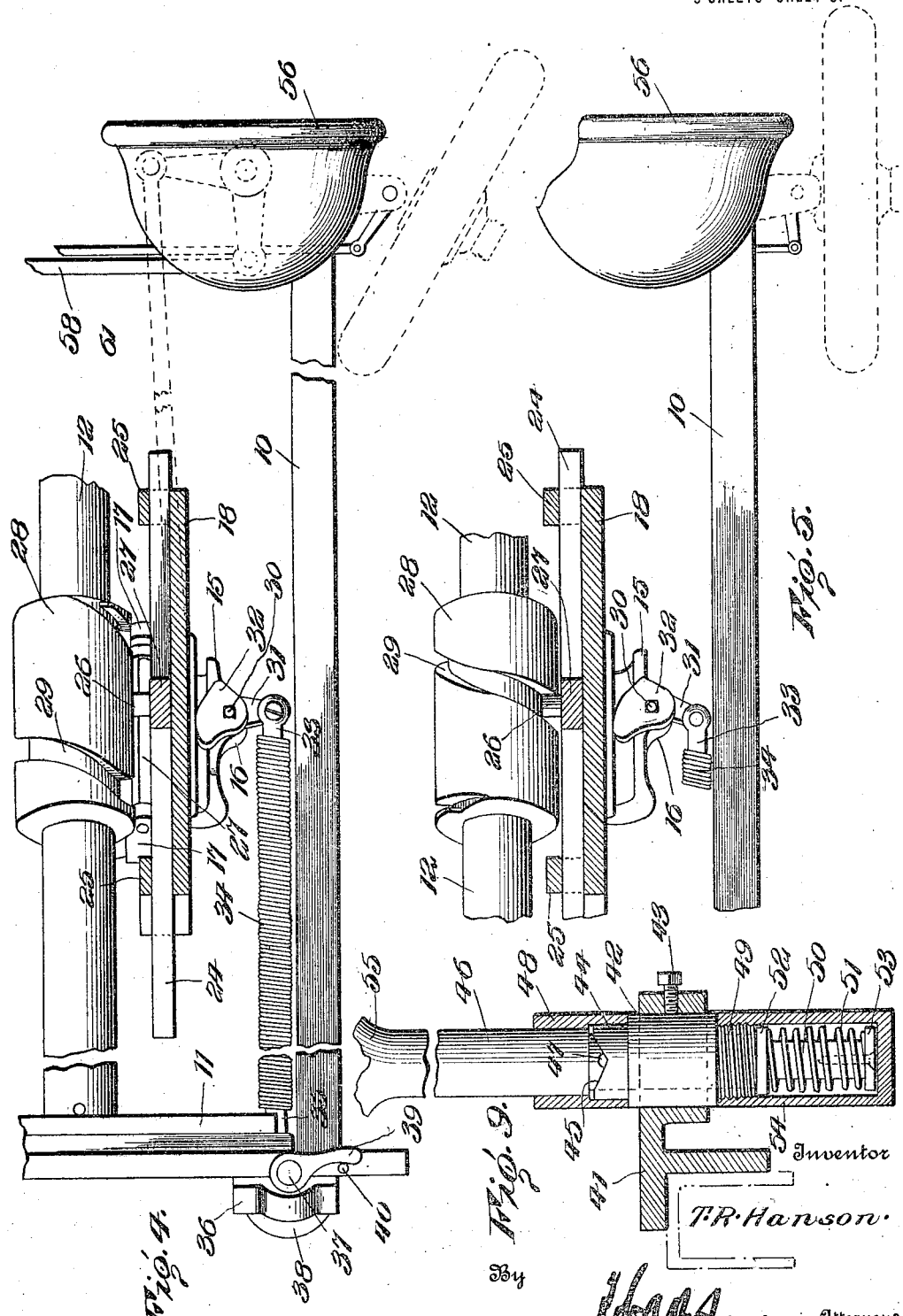

UNITED STATES PATENT OFFICE.

THOMAS R. HANSON, OF TUSCALOOSA, ALABAMA.

DIRIGIBLE-HEADLIGHT MECHANISM.

1,243,290.  Specification of Letters Patent.  Patented Oct. 16, 1917.

Application filed November 25, 1916. Serial No. 133,404.

*To all whom it may concern:*

Be it known that I, THOMAS R. HANSON, a citizen of the United States, residing at Tuscaloosa, in the county of Tuscaloosa and State of Alabama, have invented certain new and useful Improvements in Dirigible-Headlight Mechanism, of which the following is a specification.

This invention relates to an improved headlight steering mechanism for motor vehicles and has as its primary object to provide an arrangement wherein the headlights may, when desired, be coupled with the steering mechanism of the vehicle to be operated therefrom.

The invention has as a further object to provide an arrangement wherein upon the setting of a proper control lever, the mechanism will automatically act to couple the headlights with the steering mechanism of the vehicle and wherein the headlights will be so coupled only when the front wheels of the vehicle are shifted to assume a proper position with respect to the headlights or, in other words, when the front wheels of the vehicle and the headlight are directed straight ahead.

And a still further object of the invention is to provide an arrangement wherein upon disconnecting the headlights from the steering mechanism of the vehicle, the said headlights will be automatically returned to their normal position directed straight ahead.

Other and incidental objects will appear as the description proceeds and in the drawings wherein I have illustrated the preferred embodiment of the invention and wherein similar reference characters designate corresponding parts throughout the several views:

Figure 1 is a fragmentary plan view showing my improved mechanism applied to a conventional type of motor vehicle, only the parts of the vehicle necessary to show the mounting of the improved mechanism, being illustrated, Fig. 2 is a fragmentary perspective view showing the swinging carrier employed for the operating slide of the mechanism, this slide being arranged for engagement with a worm upon the steering post of the vehicle, Fig. 3 is a sectional view showing the slide carrier moved to active position with the said slide engaged with the worm upon the steering post, Fig. 4 is a fragmentary plan view showing the control lever of the mechanism set for coupling the headlights with the steering mechanism of the vehicle, this view particularly illustrating the manner in which the lug of the operating slide of the headlight mechanism is arranged to ride over the worm upon the steering post until the front wheels of the vehicle are turned to proper position relative to the said headlights with the said wheels and headlights directed straight ahead, Fig. 5 is a view similar to Fig. 4, particularly illustrating the manner in which the operating slide of the headlight mechanism will be yieldably moved to automatically engage with the worm upon the steering post when the front wheels of the vehicle are turned to a position directed straight ahead, Fig. 6 is a fragmentary sectional view showing the mounting of the control lever and shaft, Fig. 7 is a detail sectional view showing the loose connection between the sections of the rod extending from the operating slide of the headlight mechanism to the headlights, this connection being designed to take up the play in the steering wheel, Fig. 8 is a fragmentary perspective view particularly showing the arrangement of the headlights upon the side members of the chassis of the vehicle, and Fig. 9 is a fragmentary sectional view particularly showing the mounting of the said headlights and illustrating the mechanism employed for returning and holding the said headlights in normal position directed straight ahead.

In order that the construction, mounting and operation of my improved mechanism may be accurately understood I have, in the drawings, shown the said mechanism in connection with a conventional type of motor vehicle, the chassis of which is formed with side members 10. Rising from the said side members is the dash 11 of the vehicle and extending through the said dash is the steering post or column 12 of the steering mechanism of the vehicle. Coming now more particularly to the subject of the present invention, I employ a plate 13 connected to one of the side members 10 of the chassis to extend beneath the steering post 12. Mounted upon this plate is a base block 14 having its upper face inclined, as particularly shown in Fig. 2, to accord with the inclination of the steering post. Rising from this block, at the inner end thereof, is an upstanding arm or post 15 provided, at its upper extremity, with a laterally projecting lug 16. Arranged at opposite sides of the block are upstanding ears or plates 17 and swingingly mounted between the said ears is a slide carrier or yoke 18. This yoke, at its lower extremity, is formed with spaced arms 19 directed laterally at their inner extremities to form terminal lugs or extensions 20 extending outwardly over the upper face of the block. Fitting through the said arms is a pivot pin 21 received by the ears 17 for swingingly supporting the carrier upon the block. The lugs 20, adjacent their outer extremities, are provided with notches upon the lower sides thereof and engaging in the said notches are the extremities of a spring 22, the intermediate portion of which is looped to receive a screw or other suitable fastening device, as particularly shown in Fig. 2, for connecting the spring with the block with the terminals of the spring acting upon the lugs 20 to normally swing the slide carrier to inactive position toward the arm 15.

It will now be observed that the slide carrier 18 is mounted upon the block 14 to incline in accordance with the inclination of the steering post 12 and the said carrier, at its upper extremity, is formed, at the ends thereof, with notched flanges 23. Slidably mounted in the notches in the said flanges is a reciprocating operating slide 24 connected with the carrier by strips 25 overlying the said notches. The slide 24, upon its inner side, is provided with a laterally projecting pin or stud 26 and rising from the upper edge of the slide above the said stud is an arm 27. The stud 26 is arranged to coöperate with a worm or driving element 28 upon the steering post, this worm being formed with a groove 29 to slidably receive the said stud. It will now be noted that the spring 22 will normally hold the carrier 18 against the post 15 in inactive position with the stud of the slide spaced from the said worm.

Rotatably mounted upon the lug 16 of the arm 15 is a stub shaft 30 having a crank 31 integrally formed on the lower extremity thereof and squared adjacent its upper extremity to removably receive a cam 32 lying against the upper face of the said lug and arranged to coöperate with the carrier 18. Pivotally connected to the free extremity of the crank is a stub rod 33 and attached to this rod is one end of a spring 34. The spring 34 may be of any approved type and is arranged to extend toward the dash 11 of the vehicle. Connected to the opposite end of the said spring is a stub rod 35. Mounted upon the said dash, at one side of the steering post is, as particularly shown in Fig. 6, a bearing sleeve 36. Slidably fitted through this sleeve is a short shaft 37 provided, at its lower extremity, with a disk 38 while the upper extremity of the shaft is keyed to removably receive the control lever 39. The sleeve 36 is inclined upon the dash to incline the disk 38 for receiving the outer extremity of the stub rod 35 and, as also shown in Fig. 6, this rod is pivotally connected to the said disk adjacent one side thereof. Projecting upwardly from the dash, at one side of the shaft 37, is a stop 40 for the control lever 39.

Mounted upon the inner sides of the side members 10 of the chassis adjacent the forward ends of the said members, are brackets 41 and fitted through the said brackets are bearing sleeves 42 fixed, as particularly shown in Fig. 9, upon the said brackets, by set screws 43. The sleeves 42, at their upper extremities, are provided with reduced extensions 44 having diametrically opposed notches 45 formed in the upper edges thereof. Rotatably fitted through the said sleeves are the lamp receiving posts 46 equipped with diametrically arranged pins or studs 47 disposed for engagement with the extensions 44 of the said sleeves for supporting the posts upon the sleeves with the terminals of the pins normally received within the notches 45. Fitted over the extensions 44 of the sleeves 42 and loosely receiving the posts 46 are caps 48. The sleevs 42, at their lower extremities, are provided with reduced terminals 49 and from the said terminals, the posts 46 are cut away to form reduced terminals 50. Fitted around the terminals 50 of the said post are helical springs 51 engaging, at their inner extremities with washers 52 fitted over the terminals 50 to abut the terminals 49 of the sleeves 42. Connecting the said springs with the terminals of the posts are caps 53 secured to the lower ends of the said post terminals by screws or other suitable fastening devices. The terminals 49 of the sleevs 42 are screw threaded to removably receive combined protecting and lubricating caps 54 which may be filled with a lubricant to insure the easy rotation of the posts 46 within the sleeves 42.

The posts 46, at their upper extremities, may be integrally formed or otherwise provided with lamp forks 55 which receive the headlights 56, the headlights shown being of conventional construction. As will now be observed upon reference to Fig. 9, the springs 51 will normally act to urge the posts 46 downwardly through the sleeves 42 to maintain the pins 47 engaged within the notches 45 of the extensions 44 of the said sleeves. When the said pins are so engaged within the said notches, the headlights 56 will, as particularly shown in Figs. 1 and 8, be directed straight ahead. The springs 51 will, therefore, yieldably hold the headlights in their normal position and attention is directed to the fact that all of the mechanism associated with the lamp receiving posts 46 is inclosed to be consequently protected from mud as well as the elements.

Extending rearwardly from the lamp receiving posts 46 are crank arms 57 and extending between the said arms and pivotally secured thereto is a connecting bar 58. Extending laterally and inwardly from one of the said posts is a second crank arm 59 to the outer extremity of which is fixed a depending rod or stub shaft 60. Secured to the lower end of this shaft and extending rearwardly therefrom, as particularly shown in Fig. 1, is a sectional coupling rod 61, the inner terminal of which is pivotally secured to the arm 27 of the operating slide 24. One section of the rod 61 is, as shown in detail in Fig. 7, formed with a head 62 loosely fitted within a sleeve 63 with the open end of the sleeve fitted over the adjacent terminal of the other section of the said rod and secured thereto by a pin or other suitable fastening device. The sleeve 63, therefore, provides a loose connection between the rod sections arranged, as shall presently appear, to take up any play in the steering post of the vehicle.

As shown in Fig. 1 of the drawings, the slide carrier 18 will normally stand away from the worm 28 so that, as previously described, the headlights 56 will be held by the springs 50 in normal position with the said headlights directed straight ahead in front of the vehicle. To connect the headlights with the vehicle steering mechanism to be actuated thereby, the control lever 39 is, as shown in Fig. 4, turned in a clockwise direction to engage the stop 40. This movement of the said lever will rotate the disk 38 and pull upwardly upon the stub rod 35 to stretch the spring 34, the disk assuming a position with the stub rod 35 disposed beyond the pivotal center thereof when the lever 39 is in engagement with the stop 40 so that the said spring will hold the lever against the said stop. The spring 34, upon being stretched, will, in turn, act upon the stub rod 33 to yieldably swing the cam 32 against the carrier 18 by means of the crank 31. The cam 32 pressing against the carrier 18 will overcome the tension of the spring 22 normally holding the said carrier in inactive position and swing the said carrier over toward the worm 28 with the spring 34 yieldably urging the said carrier to active position and holding the pin 26 of the operating slide 24 seated against the face of the worm. As shown in Fig. 4, the pin 26 may then ride over the face of the worm until, as illustrated in Fig. 5, the steering post 12 is turned to a position with the front wheels of the vehicle directed straight ahead. In such position of the front wheels of the vehicle, the slot 29 in the worm 28 will be brought opposite the pin 26 when the spring 34 will normally act to swing the carrier to engage the pin within the said slot. Consequently, it will be seen that while the control lever 39 may, at any time, be set to couple the headlights with the steering mechanism of the vehicle still, the headlights will not actually be so coupled until the front wheels of the vehicle are moved into proper position with respect to the headlights with the said wheels and the said headlights both directed straight ahead. However, upon the setting of the control lever 39, my improved mechanism will be automatically coupled with the steering mechanism of the vehicle, as previously described, at the first time the front wheels of the vehicle assume a proper position with respect to the lights.

Upon the engagement of the pin 26 within the slot 29 of the worm 28, rotation of the steering post 12 to steer the vehicle will cause the said pin to travel within the said slot and reciprocate the operating slide 24 upon the carrier 18. Reciprocation of the said slide will, as will be readily understood, be communicated through the rod 61 to the posts 46 so that the headlights 56 will be directed as the vehicle is steered. In this connection, it will be noted that when the headlight mechanism is thus coupled with the steering mechanism of the vehicle, the loose connection provided by the sleeve 63 between the sections of the rod 61 will act to take up any play in the steering post so that oscillation of the front wheels of the vehicle, in passing over rough roads, will not be communicated to the headlights.

Rotation of the lamp receiving posts 46 will, as will be particularly noted upon reference to Fig. 9, cause the pins 47 of the said posts to ride out of the grooves 45 in the extensions 44 of the sleeves 42 upwardly over the upper edges of the said sleeves. The posts 46 will, therefore, be lifted upwardly through the sleeves by the said pins with a consequent compression of the springs 51. Accordingly, it will be seen that when it is desired to disconnect the headlights from the steering mechanism, the control lever may be moved to the position shown in Fig. 1 when the spring 22 will swing the carrier 18 away from the worm 28 and disconnect the pin 26 of the operating slide 24 from the said worm. As soon as this occurs, the springs 50 will, by pressing downwardly upon the posts 46, cause the pins 47 to ride back into the notches 45 and rotate the posts 46 to their normal position with the headlights 56 directed straight ahead. In this way, the headlights will, without regard to their position when the slide 24 is disconnected from the worm 20, always be automatically returned to normal position directed straight ahead.

Having thus described the invention, what is claimed as new is:

1. A dirigible headlight mechanism for vehicles including a rotatable lamp receiving post, a carrier, an operating member mounted upon the carrier and operatively connected with said post, and means for yieldably swinging the carrier to active position to operatively engage the said member with an element of the vehicle steering gear whereby the said post will be rotated as the vehicle is steered.

2. A dirigible headlight mechanism for vehicles including a rotatable lamp receiving post, a swingingly mounted carrier, an operating member mounted upon the said carrier and operatively connected with the said post, a cam arranged to coöperate with the carrier, and means for rotating the said cam for swinging the carrier to operatively engage the said member with an element of the vehicle steering gear whereby the said post will be rotated as the vehicle is steered.

3. A dirigible headlight mechanism for vehicles including a rotatable lamp receiving post, a swingingly mounted carrier, an operating member mounted upon the said carrier and operatively connected with the said post, means for swinging the carrier to active position to operatively engage the said member with an element of the vehicle steering gear whereby the said post will be rotated as the vehicle is steered, and a control lever for operating the said means.

4. A dirigible headlight mechanism for vehicles having a steering mechanism including a steering post, said headlight mechanism including a rotatable lamp receiving post, a carrier, a slide mounted to reciprocate upon the carrier and provided with a stud, an operative connection between the said slide and the said lamp receiving post, a worm mounted upon the said steering post, and means for shifting the said carrier to engage the stud of said slide with the said worm at a predetermined position of the steering post whereby the lamp receiving post will be rotated as the vehicle is steered.

5. A dirigible headlight mechanism for vehicles including a rotatable lamp receiving post, a carrier, an operating member mounted upon the said carrier and operatively connected with the said post, means for shifting the carrier to engage the said member with an element of the vehicle steering gear whereby the said post will be rotated as the vehicle is steered, a control lever, and a yieldable connection between the said lever and the said means with the lever operable for actuating the said means.

6. A dirigible headlight mechanism for vehicles including a rotatably mounted lamp receiving post, an operating member operatively connected with the said post, a driving element fixed to the steering post of the vehicle, and means for shifting the said member to a position to ride over the said element for engagement therewith only at a predetermined position of the lamp receiving post for rotating the said lamp receiving post as the vehicle is steered.

7. A dirigible headlight mechanism for vehicles including a rotatable lamp receiving post, an operating member operatively connected with the said post, a driving element fixed to the vehicle steering post, and means arranged to be set for holding the said member against the said element to ride thereover and automatically shifting the member to engage with the element only at a predetermined position of the lamp receiving post for rotating the said lamp receiving post as the vehicle is steered.

8. A dirigible headlight mechanism for vehicles including a rotatable lamp receiving post, an operating member operatively connected with the said post, a driving element fixed to the steering post of the vehicle and formed to engage with the said operating member only at a predetermined position of the said lamp receiving post, and means for shifting the said member to a position riding over the said element to be engaged thereby for rotating the lamp receiving post as the vehicle is steered.

9. A dirigible headlight mechanism for vehicles including a rotatable lamp receiving post, a carrier, an operating member mounted upon the carrier and operatively connected with said post, a driving element fixed upon the vehicle steering post, means for shifting the carrier to a position holding the said member against the said element to ride thereover for engagement by the said element only at a predetermind position of the lamp receiving post, and yieldable means coacting with the carrier for normally holding the said member away from the said element.

10. A dirigible headlight mechanism for vehicles including a rotatable lamp receiving post, an operating member operatively connected therewith, a worm mounted upon the vehicle steering post, and means for shifting the said member to a position riding over the said worm for engagement therewith only at a predetermined position of the lamp receiving post for rotating the said post as the vehicle is steered.

11. A dirigible headlight mechanism for vehicles including a rotatable lamp receiving post, a driving element fixed to the vehicle steering post, a pivoted carrier mounted adjacent the said element and provided with an arm, an operating member mounted upon the said carrier and operatively connected with the lamp receiving post, means for pivoting the carrier to a position holding the said member against the said element to ride thereover for engagement with the said element only at a predetermined position of the lamp receiving post, and yieldable means engaging the arm of the said carrier for swinging the carrier away from the said element and disengaging the said member therefrom.

12. A dirigible headlight mechanism for vehicles including a rotatable lamp receiving post, a driving element fixed upon the vehicle steering post, base block mounted adjacent the steering post and provided with an upstanding arm, a carrier swingingly mounted upon the said block at one side of said arm, an operating member slidably mounted upon the said carrier and operatively connected with the lamp receiving post, and means mounted upon the arm of said block and engageable with the carrier for swinging the carrier to engage the said member with the said element for rotating the lamp receiving post as the vehicle is steered.

In testimony whereof I affix my signature.

THOMAS R. HANSON. [L. S.]

Copies of this patent may be obtained for five cents each, by addressing the "Commissioner of Patents, Washington, D. C."